United States Patent
Huber

[15] 3,681,683
[45] Aug. 1, 1972

[54] GYROMAGNETIC RESONANCE SPECTROMETER UTILIZING AN IMPROVED SAMPLE SPINNING AND EJECTING STRUCTURE

[72] Inventor: Ulrich Huber, Palo Alto, Calif.
[73] Assignee: Varian Associates, Palo Alto, Calif.
[22] Filed: Sept. 14, 1970
[21] Appl. No.: 71,954

[52] U.S. Cl. .............................................324/0.5 R
[51] Int. Cl. ...........................................G01n 27/00
[58] Field of Search..........324/05.5 R, 0.5 A, 0.5 AH

[56] References Cited

UNITED STATES PATENTS 3,512,078    5/1970    Hall...............................324/0.5
3,172,035    3/1965    Arnold..........................324/0.5

Primary Examiner—Michael J. Lynch
Attorney—Stanley Z. Cole and Vincent W. Cleary

[57] ABSTRACT

A gyromagnetic resonance spectrometer employing a turbine affixed to a sample holder and responsive to a flow of air for spinning the sample under investigation in the magnetic field, the turbine floating on a column of air within a fixed stator or housing structure, is described. Air bearings are provided for the rotating sample holder within the stator or housing. Means is provided for blocking the egress of the air from the air bearings to eject the sample holder from the magnetic field.

17 Claims, 7 Drawing Figures

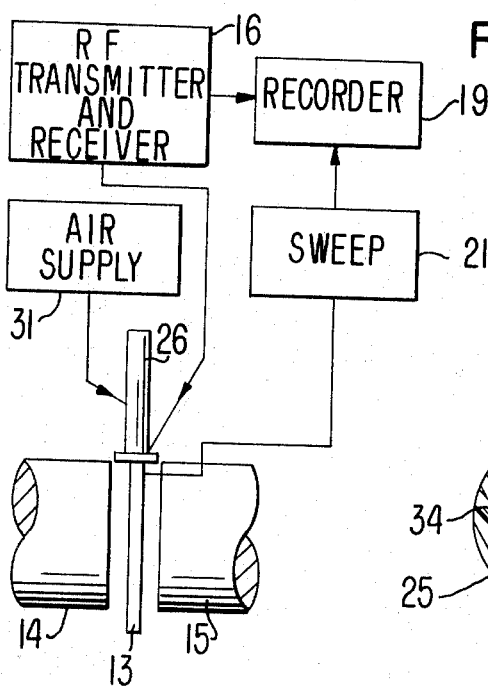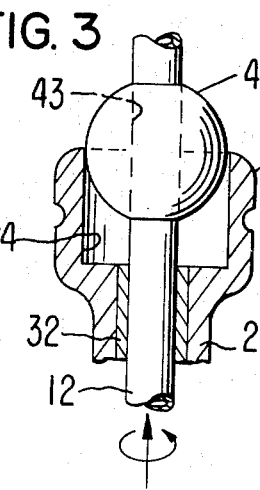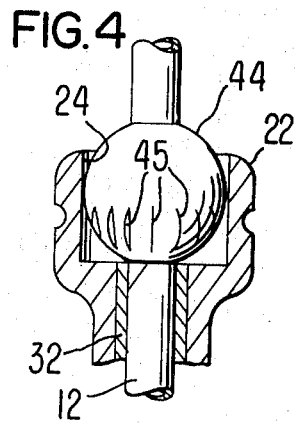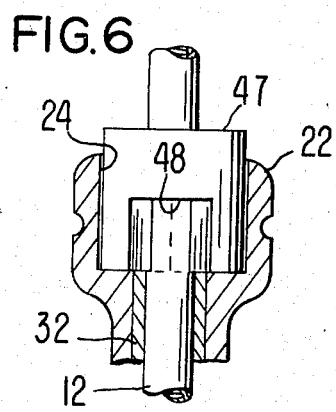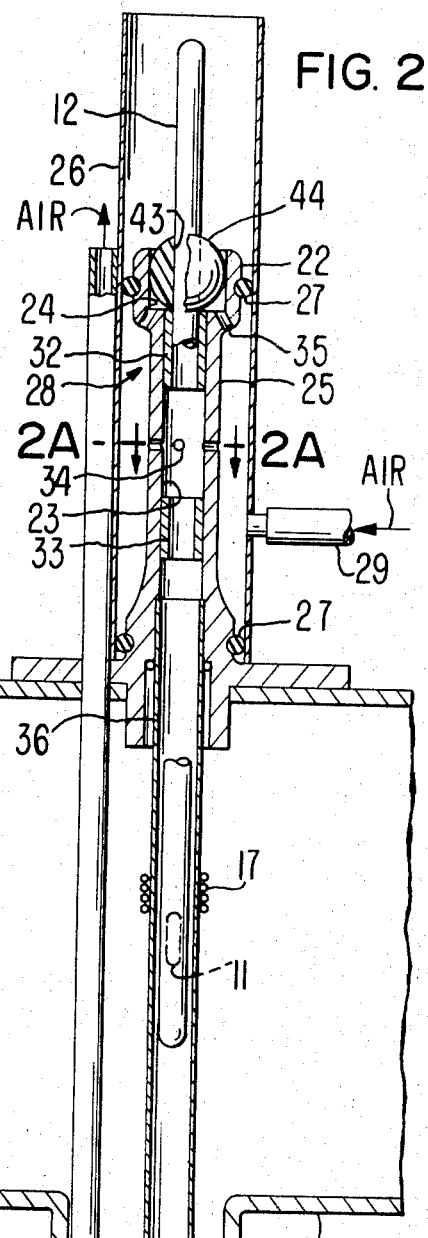

GYROMAGNETIC RESONANCE SPECTROMETER UTILIZING AN IMPROVED SAMPLE SPINNING AND EJECTING STRUCTURE

BACKGROUND OF THE INVENTION

Heretofore, air driven turbines have been employed for spinning the samples in the gap of the magnet of a nuclear magnetic resonance spectrometer for the purpose of averaging out residual magnetic field gradients in the polarizing magnetic field to thereby improve the resolution of the resonance lines of the spectrum. This sample spinning technique is disclosed and claimed to U.S. Pat. No. 2,960,649 issued Nov. 15, 1960.

Sample spinners in prior spectrometers take the form, generally, of a fixed stator or housing portion having a frusto-conical cavity which accommodates a frusto-conical shaped rotor, the rotor supporting the sample holding means, generally a glass vial. Several jets of air are directed through the walls of the conical-shaped stator and against the mating frusto-conical surface of the rotor, producing a rotational movement of the rotor in the stator and thus of the sample within the magnetic field. To improve the torque of the rotor, indentations or buckets may be provided in the bearing surface of the rotor, the air impinging on the bucket surfaces to enhance the driving action of the air against the turbine. During rotation, the frusto-conical surface of the turbine is separated from the mating frusto-conical surface of the stator by a very thin film of air, the rotor riding on this air film.

It has been found in practice that the dimensions of the stator and the rotor must be held within very close tolerances to insure that the rotor will mate closely with the stator and will not bind on the stator surface during rotation. In addition, the mating surfaces must be free of burrs, air pockets, foreign matter and the like since any such slight imperfection will produce instability in the rotation, and at times will cause the rotor to cease rotational motion. Often times, after the stators and rotors have been manufactured, it is necessary to try a number of rotors within any one particular stator before a proper match can be made between rotor and stator. In addition, in order to obtain the stable rotational motion necessary, it has been found necessary that skilled machinists re-machine the manufactured rotors to produce the necessary dimension tolerances between the matched rotor and stator. This results in a high cost for the initial manufacture as well as field problems when rotors cease to perform well with the matched stator mounted in the probes.

SUMMARY OF THE PRESENT INVENTION

In the present invention, a new form of rotor for a spinning sample probe is provided which rides upon a cushion or column of air within a stator or housing, the tolerances between the rotor and housing being very loose so that their manufacture requires no precision machining, any rotor being usable with practically any stator so that the rotor and stator matching problems are eliminated.

The rotor and stator are designed so that the mating surface between the two units is a very thin linear area rather than an extensive surface area as in prior spinners. This thin line mating or bearing surface results in very little friction between the two relative moving parts with no problems resulting from minute burrs, air pockets or foreign matter. The cost of manufacture of the new rotor and stator structure is reduced by a factor of a hundred or more and field problems are greatly reduced since there is no critical mating of a particular rotor with a particular stator.

In one embodiment of the invention, the rotor is spherical shaped with an axial bore, the ball rotor sliding over and being affixed to the sample vial. The ball rotor nests within a cavity in the stator or housing, and, when driving air is directed against the under surface of the rotor within the housing, the ball rides up in the housing and rests upon a cushion of air formed within the housing, the air stream driving the ball in a rotary manner. Thus, the ball rests upon and is driven in a rotary direction by the moving column of air under the ball. The air escapes from the housing at its top and around the circumference of the ball, the vertical movement of the ball at the upper edge of the housing serving to regulate the size of the air egress opening. Thus, the floating ball controls the flow of air out from the housing in a self-regulating manner.

In another embodiment, the rotor takes the form of a cylinder which, as with the ball rotor, floats on a column of air within a cavity in the stator. The floating cylindrical rotor also regulates the amount of the air permitted to escape from the top of the housing and thus self-regulates its floating position within the housing.

In addition, the stator structure for the device is provided with air bearings between the stator and the rotating sample holder, i.e., the glass vial, so as to greatly reduce the tendency for instability or wobbling along the length of the rotating sample vial. In this manner, the need for precision ground sample holders or vials has been eliminated as well as the need for maintaining critical tolerances at the bearing points along the sample vial.

The fluid or air flow utilized in the air bearings within the stator structure is also employed to eject the sample holder and associated rotor structure from between the pole faces of the magnet structure.

DESCRIPTION OF THE DRAWINGS

FIG. 1 is a block diagram of a nuclear resonance spectrometer system which utilizes the improved spinner apparatus of the present invention.

FIG. 2 is a cross section view of the sample spinner apparatus of the present invention.

FIG. 2A is a cross section view of the spinner apparatus taken along section line 2A—2A of FIG. 2.

FIG. 3 is a fragmentary cross section view showing the rotor portion of the spinner apparatus in its operating position.

FIGS. 4, 5 and 6 are fragmentary cross section views illustrating different embodiments of the spinner apparatus of the present invention.

DESCRIPTION OF THE PREFERRED EMBODIMENTS

Referring now to FIGS. 1 and 2 and 2A, there is shown a nuclear magnetic resonance spectrometer which incorporates the novel spinning apparatus of the present invention. The sample of matter 11 to be analyzed is disposed in a sample vial 12, for example a glass tube, within a probe 13, which is positioned in the uni-directional magnetic field produced in the gap between the pole pieces 14 and 15 of a permanent or electro-magnet structure. A radio frequency transmitter-receiver 16 supplies RF energy to a tuned coil 17 in the probe adjacent the sample. The RF energy supplied to the coil 17 serves to irradiate the sample with a radio frequency magnetic field perpendicular to the unidirectional magnetic field to produce nuclear magnetic resonance of the sample 11. Resonance signals from the sample 11 are detected in the coil 17 and are fed to the radio frequency transmitter-receiver 16 where the signals are amplified and detected to produce an output resonance signal which is then fed to a suitable recorder means 19. A means 21 for scanning is provided to sweep through the resonance.

In order to average out the effect of gradients in the uni-directional magnetic field, the sample 11 is rotated about the vertical axis at a suitable rate, such as, for example, 25 to 40 revolutions per second, resulting in an improved resolution of the magnetic resonance signal.

The sample spinning apparatus comprises a cylindrical stator or housing 22 made of a suitable material such as Delrin, Teflon, or Nylon, the housing being provided with an axial bore 23 extending therethrough, an enlarged cylindrical cavity opening 24 at the upper end thereof, and a recessed portion 25 in its outer surface. A hollow cylindrical sleeve 26 is secured by O-rings to the cylindrical housing 25 and forms an annular-shaped chamber 28 therebetween. The outer sleeve 26 is provided with an opening leading to the annular chamber 28 and a flexible tube 29 is coupled to the opening to provide a flow of air or gas from an air, or gas supply 31 into the annular chamber.

A pair of spaced-apart hollow cylindrical bearing members 32, 33, made of, for example, stainless steel or aluminum are affixed within the bore 33. A first plurality of small holes or jets 34 leads from the chamber 28 into the portion of the bore 23 between the two bearings 32, 33 and a second plurality of holes or jets 35 leads from the chamber 28 into the upper cavity 24 of the housing 22. These jets are directed tangentially to the bore 23 and cavity 24 as illustrated in FIG. 2A.

A hollow cylindrical coil form 36 is secured to the bottom of the housing 22, this coil form supporting the radio frequency coil 17 on its outer surface. The lower end of the coil form 36 is secured in the probe body by O-ring 37 and is closed off by cap 38 which has an opening therein coupled to a flexible tubing 39 through which air may pass out from within the coil form 36.

The vial 12 which carries the sample 11 to be analyzed is securely held within an axial bore 43 extending through a sphere or ball rotor 44 made of a suitable plastic material such as the material of the housing 22. The diameter of the ball 44 is of such a value that the ball rotor will readily sit down into the cavity 24 with the bottom portion of the ball resting on the bottom surface of the cavity. For example, in one spinner structure made in accordance with the invention, the diameter of the ball was 0.500 inches and the diameter of the cavity opening was 0.505 inches, thus providing a relatively loose tolerance between the ball size and the cavity size.

In operation, when it is desired to spin the sample, air is directed through the tube 29 and into the annular cavity 28 from where it passes into the stator cavity 24 through the set of jets 35 and into the annular cavity formed between the vial 41 and the bore 23 between the two bearings 32, 33 through the second set of jets 34. The air is directed onto the undersurface of the ball 44 in a tangential fashion so as to lift the ball and at the same time urge it in a rotational direction. The ball 44 rises in the housing 22 until such time as its upper hemisphere is above the top edge of the housing cavity 24 and its lower hemisphere below the edge. As the ball hovers in this position, it can be seen that the air will pass out from between the inner surface of the cavity edge and the outer surface of the ball over a very thin line area between the circumference of the ball 44 and the outer edge of the cavity 24. Should the ball tend to rise higher than the mid position it tends to open a larger gap between itself and the housing to permit a greater amount of air to escape. On the other hand, should the ball be lowered into the cavity from its mid position, it tends to close off the egress area for the air. Thus, the air escaping from the cavity does so in a somewhat quadratic function relative to the distance of movement of the sphere rotor out from the cavity. The result is that the ball will act in a self-regulating manner to provide the proper air egress opening to maintain the ball floating in a very stable manner near its centered position. In this centered position, the sample 11 held in the vial 12 is properly positioned within the radio frequency coil 17.

Since air is escaping completely around the circumference of the ball, there is very little tendency for the ball to strike the inner surface of the cavity and such contact, even if it should occur, would occur only along a thin line area as opposed to the large surface contact area encountered in the frusto-conical form of prior art rotor and stator structure.

The air directed into the axial chamber of the housing through the jets 34 flows in both upward and downward directions over the surfaces between the vial and the two bearings 32, 33. This air provides an air bearing at each of the two bearings and produces a stability in the rotation of the vial 12 within the housing 22 and reduces any tendency for the glass vial to rattle within the housing while spinning.

In those instances where access to the gap between the magnet poles 14 and 15 is difficult, the present apparatus provides an efficient method for raising or "popping" the rotor 44 and sample vial 41 out from the magnet such as disclosed in U.S. Pat. No. 3,512,078 issued on May 12, 1970 to H. J. Hall. In order to cause the rotor and associated sample vial to move up to the top of the tubular sleeve 26, the operator blocks off the tube 39 to prevent the egress of air passing over the lower beaing 33. By blocking this air passage, air pressure is built up beneath the rotor and vial and lifts the rotor structure up to the top of the tubing 26.

In order to obtain reliable and responsive spinning action, the rotor should have a high torque and a low moment of inertia and low mass; as the moment of inertia and mass decrease in value, the torque need not be so high. In the present spinner the moment of inertia and mass are considerably lower than prior spinners so that the spinning action of the present spinner is substantially improved in liveliness and reliability over the spinners of prior design.

If one desires to increase the torque of the ball rotor, buckets 45 of the type shown in FIG. 4 may be cut into the under surface of the sphere 44 to provide the air stream with more exposed surfaces upon which it may impinge.

Additional torque may be obtained by increasing the vane surfaces and at the same time decreasing the mass of the rotor by machining the under surface of the ball to produce vanes or paddles 46 such as the ball rotor shown in FIG. 5.

The rotor need not be spherical in shape and may take other forms such as, for example, the cylindrical form shown in FIG. 6. In this embodiment, the modified cylindrical shaped rotor 47 floats up on the air column until such time as the upper surface 48 of the vane section of the cylinder reaches the top of the cavity (top of member 22) at which time the floating cylinder permits an increased amount of air to escape from beneath it. The cylinder floats in a self-regulating manner to control the air egress opening and thus floats and rotates at stabilized, centered position.

In the above described embodiments the dimensions of the rotors and the cavities in the stators are substantially less critical than the dimensions of the frusto-conical rotors and stators of the prior spinner devices. These new rotors and stators may be made by standard plastic molding techniques.

What is claimed is:

1. In a gyromagnetic resonance spectrometer apparatus, probe means for holding a sample of matter in a unidirectional polarizing magnetic field, means for exciting and detecting gyromagnetic resonance of the sample in the polarizing magnetic field, a fluid driven sample spinner apparatus for rotating the sample within the magnetic field including a rotor in said probe means for holding said sample and a stator having a vertical axis mounted in said probe means and said stator being configured to carry said rotor and for maintaining said sample along said vertical axis, THE IMPROVEMENT COMPRISING, said stator having a cavity in its top, said cavity having jets in the lower portion thereof, means for directing fluid through said jets into said cavity, said rotor comprising a member fitting at least partially within said cavity in said stator said cavity being configured relative to said rotor such that the bearing surface between said cavity and a rotor is evenly distributed about said axis, said bearing surface being a minimum area having an annular shape, substantially less than the related cross section area of said rotor, said rotor member floating on a cushion of said fluid contained beneath said rotor and within said cavity, said rotor member floating upon said cushion near the top of said cavity so as to allow said fluid to evenly egress from the cavity out around the rotor member.

2. The apparatus as claimed in claim 1 wherein said stator cavity is substantially cylindrical shaped and wherein said rotor member is substantially spherical shaped.

3. The apparatus as claimed in claim 2 wherein said spherically shaped rotor member has a plurality of buckets formed in the undersurface thereof.

4. The apparatus as claimed in claim 2 wherein said spherically shaped rotor member has plurality of vanes formed in the undersurface thereof.

5. The apparatus as claimed in claim 1 wherein said stator cavity is substantially cylindrical shaped and wherein said rotor member is substantially cylindrical shaped.

6. The apparatus as claimed in 5 wherein said cylindrically shaped rotor member has a plurality of vanes formed in the undersurface thereof.

7. The apparatus as claimed in claim 1 wherein said stator comprises a housing having said stator cavity in the upper portion thereof and a pair of spaced-apart bearings in the lower portion thereof, and wherein said rotor includes a vial for holding said sample, said vial extending through the spaced-part bearings in said stator, said stator being provided with jets for directing said fluid over said spaced-part bearings.

8. The apparatus as claimed in claim 7 wherein said stator cavity is substantially cylindrical shaped and wherein said rotor member is substantially spherical shaped.

9. The apparatus as claimed in claim 8 wherein said spherically shaped rotor member has a plurality of buckets formed in the undersurface thereof.

10. The apparatus as claimed in claim 8 wherein said spherically shaped rotor member has a plurality of vanes formed in the undersurface thereof.

11. The apparatus as claimed in claim 7 wherein stator cavity is substantially cylindrical shaped and wherein said rotor member is substantially cylindrical shaped.

12. Spin apparatus for a gyromagnetic spectrometer sample holder comprising,
rotor means, said rotor means having a bore therethrough for receiving said sample holder;
a stator assembly having an uppermost, middle and lower section, each section having an aligned bore for passing said sample holder therethrough;
a cylindrical sleeve disposed about said stator assembly so as to form an enclosed volume therebetween;
means for directing a fluid under pressure into said enclosed volume;
said stator assembly being centrally disposed within and fixedly coupled to said sleeve at said uppermost and lower section, said uppermost section including rotor cavity means in the top of said uppermost section for receiving said rotor, said rotor cavity means being configured relative to said rotor means such that a minimum contact bearing surface during operation is provided, said bearing surface being annularly shaped and being substantially less than the cross-sectional area of said rotor.

13. The spin apparatus of claim 12 wherein said stator assembly is fixedly coupled to said uppermost and lower section of said sleeve with a pair of elastomeric O-rings.

14. The apparatus of claim 12 wherein said rotor cavity means is substantially cylindrically shaped and wherein said rotor means comprises a modified cylindrically shaped member, said modified member having a plurality of cavities in the bottom face of said modified cylinder, said cavities extending through to a predetermined level at the sides of said modified cylinder.

15. The apparatus of claim 12 wherein said rotor cavity means is cylindrical and said rotor is spherical.

16. The apparatus of claim 15 wherein said spherically shaped rotor has a plurality of indentations to increase turbine torque and reduce inertia.

17. The apparatus of claim 12 wherein the middle section of said stator includes a pair of spaced apart bearings and an aperture therethrough between said pair of bearings, said aperature for directing said fluid over said spaced apart bearings to provide lateral stability to said spinning sample holder.

* * * * *